United States Patent [19]

Arenhold

[11] Patent Number: 4,621,824
[45] Date of Patent: Nov. 11, 1986

[54] ELONGATED SPACER FOR ARRANGEMENT BETWEEN A MUD FLAP AND MOTOR VEHICLE FENDER FOLD

[76] Inventor: Knut Arenhold, Westend 7, 2000 Hamburg 52, Fed. Rep. of Germany

[21] Appl. No.: 738,653

[22] Filed: May 28, 1985

[30] Foreign Application Priority Data

Jun. 6, 1984 [DE] Fed. Rep. of Germany ....... 3420986

[51] Int. Cl.$^4$ ............................................. B62D 25/16
[52] U.S. Cl. .............................. 280/154.5 R; 277/215
[58] Field of Search ............... 280/153 R, 153 A, 154, 280/154.5 R, 154.5 A; 296/93; 277/183, 184, 186, 209, 211, 215

[56] References Cited

U.S. PATENT DOCUMENTS

| 3,131,742 | 5/1964 | Munse | 277/186 X |
| 4,477,092 | 10/1984 | Bush | 277/167.5 X |

FOREIGN PATENT DOCUMENTS

| 1962863 | 6/1971 | Fed. Rep. of Germany | 280/154.5 |
| 3136592 | 2/1983 | Fed. Rep. of Germany | 280/154.5 R |
| 1442226 | 7/1976 | United Kingdom | 280/154.5 R |

*Primary Examiner*—David M. Mitchell
*Assistant Examiner*—Michael Mar
*Attorney, Agent, or Firm*—Murray and Whisenhunt

[57] ABSTRACT

An elongated moulding made from rubber, plastic, etc. is cross-sectionally provided with a leg (12) for arrangement between a mud flap (5) and the fender fold (3) of a motor vehicle, and which mud flap (5) has a main flap body (6) and an adapting protrusion (7) connected to the top thereof. A widened material portion (11) is connected to the leg (12). The leg (12), which is to be arranged between the mud flap (5) and the fender fold (3), has notches (13) extending from the free longitudinal edges (17) to the transition area with the widened material portion (11), and these notches extend at right angles to the free longitudinal edge (17). In the fitted state, the widened material portion (11) engages on the vehicle body area adjacent to the fender fold (3).

19 Claims, 5 Drawing Figures

ELONGATED SPACER FOR ARRANGEMENT BETWEEN A MUD FLAP AND MOTOR VEHICLE FENDER FOLD The present invention relates to a spacer for disposition between an automobile mud flap and a fender fold of the automobile fender when the mud flap is attached to the fender fold.

BACKGROUND OF THE INVENTION

In U.S. application Ser. No. 619,137, filed June 11, 1984 and entitled METHOD FOR FIXING A MUD FLAP TO A MOTOR VEHICLE, A MUD FLAP AND DEVICE FOR PERFORMING THE METHOD, the present applicant has disclosed a spacer for an automobile mud flap, preferably made of a molded plastic or rubber, wherein the spacer is in a generally L-shape configuration. The spacer, therefore, has, generally, two legs and, in part, functions to provide a neat appearance for the attachment of the mud flap, in that the spacer provides a smooth transition between the mud flap and the car body adjacent to the fender fold. To achieve adaptation of the spacer to various fender fold configurations, the positioning of the spacer, with respect to the mud flap, can be varied within limits to accommodate different fender contours. Thus, that spacer makes it possible to produce a relatively flat mud flap having a bearing rib disposed at the transition of the vehicle body and the mud flap. Due to the ability to vary the positioning of the spacer, with respect to the mud flap, the spacer can give reasonably neat appearances to a variety of fender fold configurations. Substantial variations in positioning of the spacer, however, are not possible with mud flaps having such bearing ribs in a permanent disposition.

While this spacer provides a very important advantage to the art, it does suffer from the disadvantage that the degree of variation of the position of the spacer, with respect to the mud flap, is limited because the spacer must be positioned on the bearing ribs of the mud flap, which ribs are within a limited area of the mud flap. As a result thereof, conforming the spacer to wider varieties of fender fold configurations is not practical.

It would be of a decided advantage in the art to provide such a spacer which is not so limited in its ability to accommodate a wide variety of contours of fenders and configurations of fender folds.

BRIEF DESCRIPTION OF THE INVENTION

The invention is based on several critical features. First, the spacer is provided with a portion or leg which is configured so that it may be placed between the mud flap and the fender fold, at least at that portion of the two where the mud flap is mechanically attached to the fender fold. Secondly, at least one notch, and preferably a plurality of notches, is provided in that leg, which notch or notches provide for the ability to deform that leg and thereby conform that leg to the contour of the fender fold and fender. Therefore, the spacer, as a result of the notches in the leg, is elastically deformable so that the entire spacer may be deformed in the plane of the leg so that the spacer can acquire a configuration which is essentially the same as the configuration of the vehicle body, i.e., fender and fender fold, to which the mud flap and spacer are attached.

Preferably, the spacer is made of molded plastics or rubbers, so as to provide a wide variety of cross-sectional shapes so that a pleasing appearance is provided in the transition between the fender and the mud flap in the area where the mud flap is attached to the fender fold. The portion of the spacer which provides that pleasing appearance is an elongated outer portion disposed generally in the vertical direction and which will bear upon both the fender, adjacent the fender fold, and upon the mud flap attached to the fender fold. Therefore, a relatively unbroken transition appearance will be provided between the fender and the mud flap.

Thus, broadly stated, the present invention, provides a spacer for disposition between an automobile mud flap and a fender fold of an automobile fender when the mud flap is attached to the fender fold. The spacer is generally comprised of an elongated outer portion adapted to be disposed in a generally vertical direction and to bear upon the outside portion of the automobile fender in an area adjacent to the fender fold and to bear upon the mud flap in the area of the mud flap which is directly attached to the fender fold. An elongated inner portion projects from the outer portion in a generally perpendicular direction thereto and is adapted to at least in part be positioned between the mud flap and the fender fold when the mud flap is attached to the fender fold. At least one notch, is and preferably a plurality of notches, are disposed laterally in the inner portion of the spacer, and these notches extend from the inner most edge of the inner portion to at least near the juncture of the inner portion and the outer portion of the spacer. These notches, as briefly explained above, allow for a deformation of the spacer for fitting the spacer to the particular contours of a particular automobile.

DETAILED DESCRIPTION OF THE INVENTION

Figure 1:
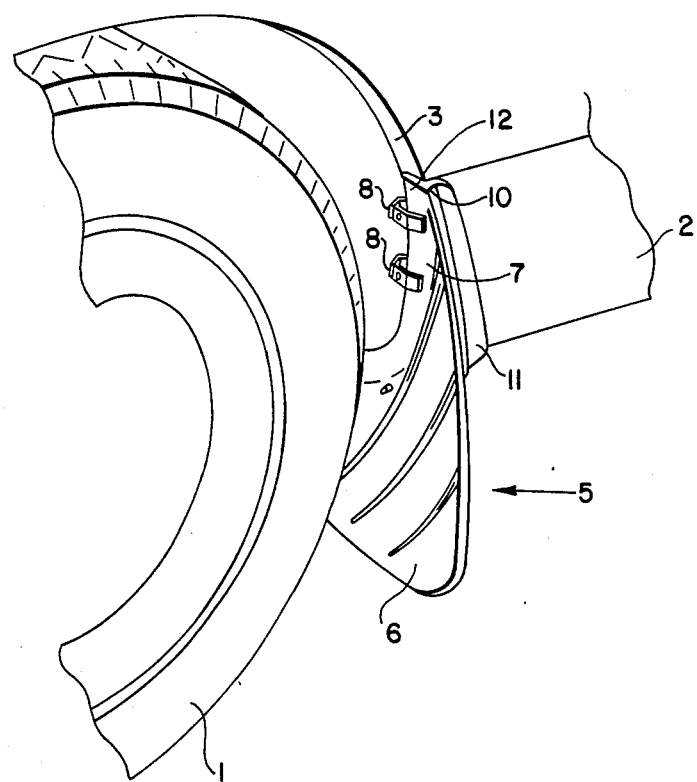
FIG. 1 is a partial view of a wheel cutout with a mud flap fixed to the fender fold and with a spacer held between the flap and fold.

FIG. 1 partially shows a wheel cutout of a car, the corresponding wheel 1 being partially indicated. The vehicle body 2 is bent inwardly in the vicinity of the wheel cutout in the usual manner, which forms a fender fold 3. As is common in the art, a mud flap, generally indicated at 5, is attached to the fender fold 3 by known means. Flap 5 has an approximately rectangular main body 6 and an adapting protrusion 7 connected to the main body 6. The inner edge of the adapting protrusion 7 of mud flap 5 engages the fender fold and is attached to the fender fold by clips 8 or other similar means, e.g., screws, as is common in the art.

Mud flaps of the above general description are well known in the art, and further details in connection therewith will not be provided in this application, for sake of conciseness.

As can be seen from FIG. 1, the present spacer is configured for disposition between the mud flap 5 and the fender fold 3 of the fender of the vehicle body 2, when the mud flap is attached to the fender fold. The spacer has an elongated outer portion 11, which is also referred to as a leg, and as can be seen from FIG. 1, that outer portion or leg, is disposed in a generally vertical direction, with respect to the automobile. That elongated outer portion 11 also bears upon the outside portion of the automobile fender 2 in the area adjacent the fender fold 3 and further bears upon the mud flap 5 in the area of the mud flap which is directly attached to the fender fold 3. This portion of the spacer is referred to as the outer portion, or outer leg, since when in place, it is disposed, essentially, on the outside of the vehicle.

The spacer also has an elongated inner portion 12, also known as a leg, which projects from the outer portion 11 in a generally perpendicular direction thereto. That inner portion is adapted to be at least in part positioned between mud flap 5 and fender fold 3 when the mud flap is attached to the fender fold.

It will also be apparent from FIG. 1 that the fender configuration of vehicle body 2 is bent inwardly in the vicinity of the wheel cutout. This bending and the exact configuration thereof will vary from vehicle to vehicle. In order to place the spacer between the mud flap 5 and fender fold 3 in a manner which conforms to the contour of the fender, the space is provided with at least one notch, and most preferably a plurality of notches, 13 (see FIG. 2). These notches allow the bending of the spacer in its longitudinal (elongated) direction so that it can conform to the configuration of the fender and make a neat appearance when in place. It will be noted that notches 13 are disposed laterally in the inner portion 12 and extend from the inner most edge 17 of the inner portion 12 to at least near the juncture of the inner portion 12 and the outer portion 11.

Figure 2:
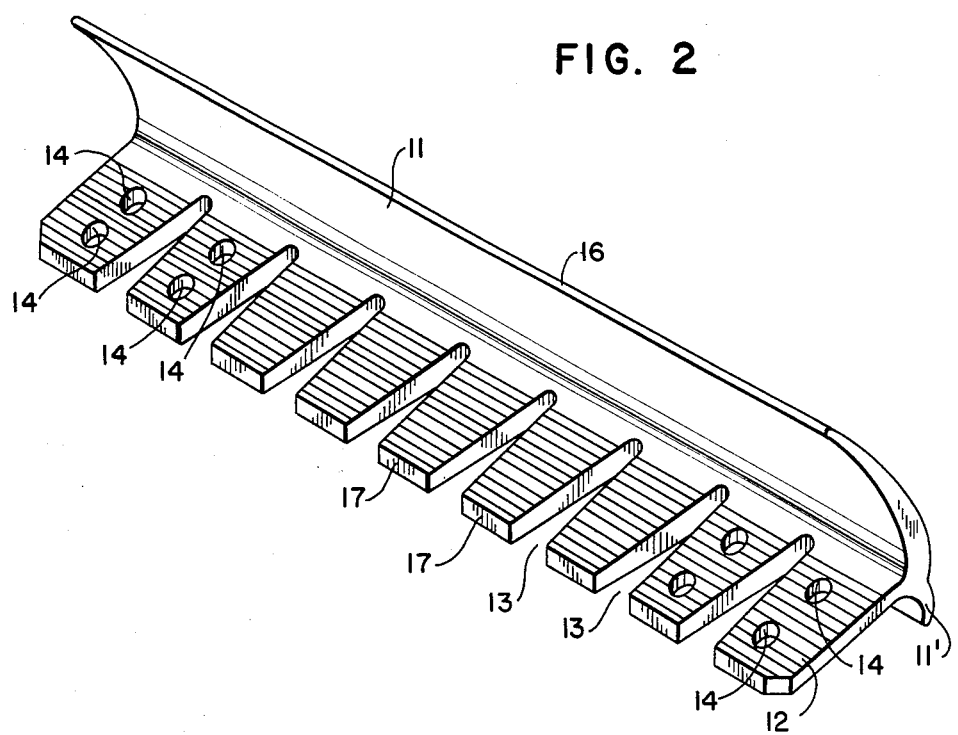
FIG. 2 is a perspective view of the spacer of FIG. 1.

It will also be apparent from FIG. 2 that the inner and outer portion may be integral portions of a single structure, and not separate attached portions. The single structure is preferably a unitary molding, and more preferably a molding of a deformable material, so that the material may be deformed to the configuration of the fender and fender fold. The deformable material is preferably a moldable plastic or rubber and, for installation by the automobile owner, preferably the plastic or rubber is deformable by hand deformation, i.e., the car owner may press against the spacer, when installing the same, and cause a deformation of the spacer to essentially fit the contour of the fender and fender fold. In view thereof, the hand deformation produced by the car owner is preferably a substantially permanent deformation, which will be a property of the plastic or rubber involved.

It will also be noted from FIG. 2 that the inner portion 12 and the outer portion 11 form a generally L-shaped configuration and that the thickness of the transition area near the juncture between the inner and outer portions forming the L-shaped configuration is greater than the thickness of any other portion of the spacer. This not only provides increased strength for conforming the spacer to the fender and fender fold by such deformation, but additionally provides a smooth contour, in combination with the fender and fender fold, when the spacer is in place.

As can also be seen from FIG. 2, preferably, each of the notches 13 has a greater width at the inner-most edge 17 of the inner portion 12 than at the juncture between the inner portion 12 and the outer portion which allows for bending and conformation above. Also, it is preferred that the notches have a rounded configuration as shown by FIG. 2, at the juncture, to facilitate such bending.

Outer portion 11, as can be seen from FIG. 2, on the outside thereof, and to some extent on the inside thereof, is convexly curved from the transition area in a direction toward the inner portion 12. This also allows a smooth and neat fit of the spacer against the fender. To further improve such a smooth fit, the outer portion is tappered from the transition area between portions 11 and 12 to the upper edge thereof, i.e., at 16.

Preferably, the outer portion of the spacer has an elongated extension 11' beyond the juncture of the inner and outer portions and this extension is from one-third to one-fifth of the dimensions of the outer portion. This extension 11' fills the space between the edge of the fender next to the fender fold and the mud flap for a neat appearance and in addition provides a positive bearing surface 10 (see FIG. 1) for the spacer to bear against the mud flap 5 and to hold that mud flap firmly in place.

While the spacer can be made of a variety of materials, as noted above, it is preferable that the spacer be made of a molded rubber or plastic, e.g., a polyolefin such as polyethylene, polypropylene, a vinyl polymer, natural rubber or synthetic rubber, although any materials of that nature may be used and the materials themselves are not critical. However, for ease of production, it is preferred that the spacer be made of a moldable plastic or rubber, particularly an injection moldable plastic or rubber. For this reason, the invention will be described below in connection with a molded spacer of that nature. By such molding techniques, the outer portion 11 can be a simple molded leg 11 and the inner portion 12 may likewise be simply a molded leg 12. Molding techniques also provide the ability to easily achieve rather complex shapes of the molding. Thus, as seen in FIG. 1, the molding may have a somewhat curved outer configuration of leg 11 with a reduced thickness of leg 11, or taper, as it approaches free edge 16 (see FIG. 2). Further, by such molding techniques, leg 12 of the molding with an inner-most free edge 17 can have notches molded therein which extend from the transition area of the legs to the inner-most free edge 17 in such a manner that the notches are wider in the vicinity of free edge 17 than in the vicinity of the notch base in the transition area, thereby forming a somewhat triangularly shaped molded notch. Preferably, notches 13 are molded with a rounded base, for ease in deforming the spacer. Such a molding can also easily produce ribs 15 (see for example FIG. 3) which are disposed on the top and bottom surfaces of leg 12 and which extend substantially parallel, in the longitudinal direction, to molded leg 12. Also, two bores 14 (See FIG. 2) may be provided in each of the two outer portions of leg 12 formed by notches 13. These can be used for attaching purposes, as explained more fully hereinafter.

The continuation of leg 11, i.e., an elongated extension 11' extends over and beyond the plane of leg 12 (See FIG. 3), i.e., beyond the juncture or transition of legs 11 and 12, and its projection over the latter is approximately ⅓ to 1/5 of the projection of leg 11 over leg 12. Both extension 11' and leg 11 are curved in the direction of the free edge 17 of leg 12, so that legs 11 and 12 form an acute angle and the outside surfaces of leg 11 and extension 11' have a convex configuration. In the transition from leg 11 to extension 11', a depression is provided in the outside surface for appearance purposes.

In order to arrange the molding between the mud flap and the fender fold, mud flap 5 is loosely attached on the fender fold, leg 12 of the molding is introduced between the flap and the fender 12, and then deformed into the desired shape by pressing leg 11 on to vehicle body 2. During the deformation of leg 11 as a result of the pressing action, adjacent portions of leg 12 bounded by the notches 13 are brought closer together, i.e., the width of notches 13 is reduced.

With such deformation, mud flap 5 can be correctly configured and then firmly fixed to fender fold 3 by tightening clips 8. This, also, will cause leg 12 to be securely fixed between mud flap 5 and fender fold 3. During this fixing step, mud flap 5 presses against extension 11′, so that it is pressed outwards (to the right in FIG. 3). Due to this displacement of extension 11′, a counterclockwise directed force (counterclockwise with respect to FIG. 3) is exerted on leg 11 and as a result the free edge 16 of the latter is pressed more firmly against body 2 and as a result a sealing engagement is obtained.

On the other hand the molding may be configured into a desired shape during attachment by passing fixing elements, such as screws, through one or more bores 14 in leg 12, as well as through corresponding bores in the mud flap. In this way the molding is prepositioned on mud flap 5 and can then be elastically deformed to configure the molding to the vehicle body contour, so that the mud flap, together with the already prepositioned molding, can be fixed and configured to the fender fold 3 while tighten the attaching screws.

The ribs 15 formed on leg 12 engage with the fender fold 3 and the inner surface of mud flap 5. This improves the engagement between the mud flap 5 and leg 12, so that there is no displacement of the molding in the fitted condition. In addition, the space between ribs 15 formed on the side of leg 12 adjacent to leg 11, provides for water which was collected between leg 12 and fender fold 3, to flow away.

Figure 4:
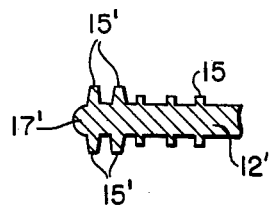
FIG. 4 is a partial cross-sectioned view of a modification of the spacer leg having notches therein.

The ribs formed on leg 12 in the vicinity of free edge 17, as indicated in FIG. 4 for a corresponding leg 12′, can be constructed in the configuration of ribs 15′, which have a greater height than the ribs 15 located between ribs 15′ and the transition zone of leg 11. With such a construction, when the width of leg 12′ exceeds the width of the fender fold 3, then the greater height ribs 15′ are located in an area beyond the free edge of the fender fold 3. In the event of a displacement of the molding towards the outside of the fender fold, ribs 15′ engage the free edge of the fender fold and prevent a further displacement of the molding.

Figure 3:
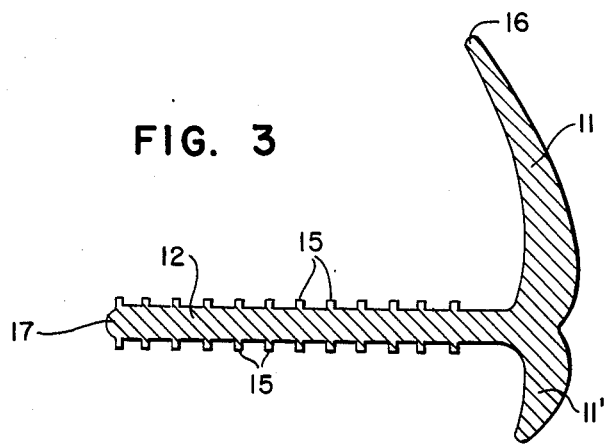
FIG. 3 is a cross-sectioned view through the spacer of FIG. 1.
Figure 5:
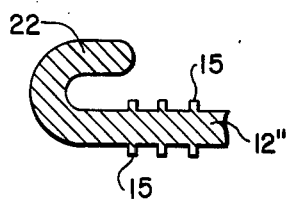
FIG. 5 is a partial cross-sectioned of view of another modification of the spacer leg having notches therein.

Another means of securing the molding against outward displacements is indicated in FIG. 5, where on the free end of leg 12″, corresponding to leg 12 in FIGS. 2 and 3 which carries ribs 15, a hook portion 22 is formed, which is disposed towards the side of leg 12″ adjacent to leg 11. In the fitted condition, this hook portion 22 engages behind the fender fold 3 and consequently prevents displacements of the molding.

From the foregoing it will be appreciated that the thickened part of the spacer near the juncture of portions 11 and 12 can have widely differing cross-sectional shapes. However, preferably, as noted above, the spacer has a substantially L-shaped cross-section.

Further, in order to allow maximum deformations of the spacer at least several notches are present, and, preferably, the notches have a greater width at the free longitudinal edge than at the base of the notch.

If the base of the notch or notches is rounded the spacer can be so deformed to give a more uniform curved configuration than in the case where the notch base is V-shaped. In the latter case, when deforming the spacer, snapping off or buckling of the spacer can occur, instead of a uniform curvature.

If in the case of an L-shaped cross-section of the spacer where the inner and outer portions form an acute angle, and particularly when outer portion 11, or its outside surface, is convexly curved towards its free longitudinal edge or has a corresponding overall curvature, there is a particularly optically attractive transition from the mud flap to the vehicle body. In this case the free edge of the inner portion 12 engages particularly well with the mud flap, if the thickness of outer portion 11 decreases from the transition area to inner portion 12.

I claim:

1. A spacer for disposition between an automobile mud flap and a fender fold of an automobile fender when the mud flap is attached to the fender fold comprising:
   (1) an elongated outer portion adapted to be disposed in a generally vertical direction and to bear upon an outside portion of said automobile fender in an area adjacent to said fender fold and to bear upon an outer edge of said mud flap in an area of said mud flap which is directly attached to said fender fold:
   (2) an elongated inner portion, having an inner-most edge and a juncture with said outer portion, projecting from said outer portion in a generally perpendicular direction, and adapted to be at least in part positioned between said mud flap and said fender fold when said mud flap is attached to said fender fold;
   (3) at least one notch disposed laterally in said inner portion and extending from said inner-most edge of said inner portion to at least near said juncture of the inner portion and said outer portion.

2. The spacer of claim 1 wherein the said inner and outer portions are integral portions of a single structure.

3. The spacer of claim 2 wherein the structure is a unitary molding.

4. The spacer of claim 3 wherein the molding is of a deformable material.

5. The spacer of claim 4 wherein the deformable material is a moldable plastic or rubber.

6. The spacer of claim 5 wherein the plastic or rubber is deformable by hand deformation.

7. The spacer of claim 6 wherein the hand deformation produces a substantially permanent deformation.

8. The spacer of claim 1 wherein the inner and outer portions form a generally L-shaped configuration and wherein the thickness of a transition area near the juncture between the inner and outer positions forming the L-shaped configuration is greater than the thickness of any other portion of the spacer.

9. The spacer of claim 8 wherein the outside surface of the outer portion is convexly curved from the transition area toward the inner portion.

10. The spacer of claim 4 wherein outside surface of the outer portion is tappered from the transition area to an upper edge of the outer portion.

11. The spacer of claim 1 wherein there are a plurality of notches and each notch has a greater width at the inner-most edge of the inner portion than at the said juncture.

12. The spacer of claim 11 wherein the said notches have a triangular shape for allowing bending and conforming the spacer.

13. The spacer of claim 1 wherein the outer portion has an elongated extension beyond the juncture of the inner and outer portions.

14. The spacer of claim 13 wherein said extension is from ⅓ to 1/5 of the dimension of the outer portion.

15. The spacer of claim 1 wherein the inner portion has on surfaces thereof substantially longitudinally extending ribs.

16. The spacer of claim 15 wherein the ribs closer to the innermost edge of the inner portion have a greater height than ribs near the side juncture.

17. The spacer of claim 1 where the inner portion forms an acute angle with the outer portion.

18. The spacer of claim 1 wherein there is a hook portion disposed near the innermost edge of the inner portion for engaging the free edge of the fender fold.

19. The spacer of claim 1 wherein there is at least one bore in the inner portion between one end of the inner portion and the first notch adjacent thereto.

* * * * *